(12) United States Patent
Bryne

(10) Patent No.: US 8,857,292 B2
(45) Date of Patent: Oct. 14, 2014

(54) PEDAL-CLEAT ASSEMBLY

(75) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 889 days.

(21) Appl. No.: 12/917,322

(22) Filed: Nov. 1, 2010

(65) Prior Publication Data
US 2012/0103131 A1 May 3, 2012

(51) Int. Cl.
B62M 3/00 (2006.01)
B62M 3/08 (2006.01)

(52) U.S. Cl.
CPC .................................... B62M 3/086 (2013.01)
USPC ......................................................... 74/594.6

(58) Field of Classification Search
CPC ................................. B62M 3/086; B62M 3/08
USPC ........... 74/594.1, 594.4, 594.6, 594.7; 36/131
IPC ....................................................... B62M 3/08
See application file for complete search history.

(56) References Cited

U.S. PATENT DOCUMENTS

| 1,370,730 A | | 3/1921 | Carver |
| 3,808,910 A | | 5/1974 | Desbois |
| 3,859,867 A | | 1/1975 | Haines et al. |
| 4,055,005 A | | 10/1977 | Meinhart |
| 4,298,210 A | | 11/1981 | Lotteau |
| 4,488,453 A | | 12/1984 | Drugeon et al. |
| 4,599,914 A | | 7/1986 | Dunn et al. |
| 4,599,915 A | * | 7/1986 | Hlavac et al. ................. 74/594.4 |
| 4,735,107 A | | 4/1988 | Winkie |
| 4,739,564 A | | 4/1988 | Eser |
| 4,803,894 A | | 2/1989 | Howell |
| 4,815,333 A | | 3/1989 | Sampson |
| 4,819,504 A | | 4/1989 | Sampson |
| 4,827,633 A | | 5/1989 | Feldstein |

(Continued)

FOREIGN PATENT DOCUMENTS

DE 2816189 A1 8/1979
DE 3315282 A1 10/1984

(Continued)

OTHER PUBLICATIONS bont.com, Bont Crono, www.bont.com/cycling/pages/bontcrono.html.

(Continued)

Primary Examiner — Thomas R. Hannon
Assistant Examiner — Adam D Rogers
(74) Attorney, Agent, or Firm — Sheppard, Mullin, Richter & Hampton LLP

(57) ABSTRACT

An improved pedal/cleat assembly includes a cleat that can be releasably secured to a pedal assembly without the need to contact the sole of a rider's shoe. The cleat is configured to include forward and rearward projections, as well as inward and outward feet, and the pedal assembly is configured to include a spindle, a main pedal body mounted on the spindle, and a cleat support base mounted on the main pedal body. The cleat support base includes inward and outward pads configured to support the cleat's inward and outward feet, and it mounts forward and rearward cleat retainers configured to receive and secure the forward and rearward cleat projections. A spring-bias device yieldably biases the forward and rearward cleat retainers toward each other. The pedal/cleat assembly thereby is configured such that the cleat can be secured to the pedal assembly without the need to contact any portion of the shoe sole.

19 Claims, 8 Drawing Sheets

(56) References Cited

U.S. PATENT DOCUMENTS

| | | | |
|---|---|---|---|
| 4,827,797 A | 5/1989 | Le Faou et al. | |
| 4,840,086 A | 6/1989 | Bidal | |
| 4,898,063 A | 2/1990 | Sampson | |
| 4,899,618 A | 2/1990 | Christol | |
| 4,936,164 A | 6/1990 | Forke | |
| 4,942,778 A | 7/1990 | Bryne | |
| 5,007,185 A | 4/1991 | Lazarski | |
| 5,031,342 A | 7/1991 | Crook | |
| 5,079,968 A | 1/1992 | Starner | |
| 5,199,324 A | 4/1993 | Sain | |
| 5,213,009 A | 5/1993 | Bryne | |
| 5,284,066 A | 2/1994 | Weiss | |
| 5,321,995 A | 6/1994 | Zedan | |
| 5,325,738 A | 7/1994 | Bryne | |
| 5,363,573 A | 11/1994 | Kilgore et al. | |
| 5,371,903 A | 12/1994 | Lew | |
| 5,406,647 A | 4/1995 | Lew | |
| 5,546,829 A | 8/1996 | Bryne | |
| 5,553,516 A | 9/1996 | Weiss | |
| 5,557,985 A | 9/1996 | Nagano | |
| 5,575,184 A | 11/1996 | De Schrijver | |
| 5,606,894 A | 3/1997 | Bryne | |
| 5,657,558 A | 8/1997 | Pohu | |
| 5,687,619 A | 11/1997 | Bryne | |
| 5,697,262 A * | 12/1997 | Chen | 74/594.6 |
| 5,727,429 A | 3/1998 | Ueda | |
| 5,765,450 A | 6/1998 | Kruger et al. | |
| 5,778,739 A | 7/1998 | Takahama | |
| 5,784,931 A * | 7/1998 | Ueda | 74/594.6 |
| 5,806,379 A | 9/1998 | Nagano | |
| 5,852,955 A | 12/1998 | Crisick et al. | |
| 5,860,330 A | 1/1999 | Code et al. | |
| 5,862,716 A | 1/1999 | Bryne | |
| 5,916,332 A | 6/1999 | Chen | |
| D413,711 S | 9/1999 | Hicks, Jr. | |
| 6,003,408 A * | 12/1999 | Hervig | 74/594.4 |
| 6,014,914 A | 1/2000 | Ueda | |
| 6,070,493 A * | 6/2000 | Chen | 74/594.6 |
| 6,128,973 A * | 10/2000 | Nagano | 74/594.6 |
| 6,151,989 A | 11/2000 | Ueda | |
| 6,205,885 B1 | 3/2001 | Hermansen et al. | |
| 6,244,136 B1 | 6/2001 | Chen | |
| 6,309,010 B1 | 10/2001 | Whitten | |
| 6,425,304 B1 | 7/2002 | Bryne | |
| 6,446,529 B1 | 9/2002 | Tanaka | |
| 6,453,771 B1 * | 9/2002 | Takahama et al. | 74/594.6 |
| 6,490,948 B2 | 12/2002 | Tanaka | |
| 6,494,117 B1 | 12/2002 | Bryne | |
| 6,581,493 B1 | 6/2003 | Gillane | |
| D481,974 S | 11/2003 | Evans | |
| 7,013,754 B2 | 3/2006 | Milanowski | |
| 7,017,445 B2 | 3/2006 | Bryne | |
| 7,174,807 B2 * | 2/2007 | Bryne | 74/594.6 |
| 7,322,259 B2 | 1/2008 | De Bast et al. | |
| 7,383,646 B2 | 6/2008 | Hall | |
| 7,472,498 B2 | 1/2009 | Bryne | |
| D595,620 S | 7/2009 | Kingsbury | |
| 7,779,560 B2 | 8/2010 | Kay | |
| 7,856,905 B2 * | 12/2010 | Hsieh | 74/594.6 |
| 7,877,904 B2 | 2/2011 | Bryne | |
| 8,272,150 B2 | 9/2012 | Bryne | |
| D683,665 S | 6/2013 | Smith | |
| 2001/0008093 A1 | 7/2001 | Heim | |
| 2002/0144569 A1 | 10/2002 | Tanaka | |
| 2003/0051576 A1 | 3/2003 | Muraoka | |
| 2004/0187635 A1 | 9/2004 | Bryne | |
| 2004/0237705 A1 | 12/2004 | Conarro et al. | |
| 2005/0155452 A1 | 7/2005 | Frey | |
| 2005/0252337 A1 | 11/2005 | Chen | |
| 2005/0284253 A1 | 12/2005 | Hervig | |
| 2006/0070489 A1 * | 4/2006 | Chen | 74/594.6 |
| 2006/0236809 A1 | 10/2006 | Bryne | |
| 2007/0084086 A1 | 4/2007 | Bryne | |
| 2007/0193402 A1 | 8/2007 | Hsieh | |
| 2010/0107451 A1 | 5/2010 | Kay et al. | |
| 2010/0301632 A1 | 12/2010 | Bryne | |
| 2012/0103131 A1 | 5/2012 | Bryne | |

FOREIGN PATENT DOCUMENTS

| | | |
|---|---|---|
| DE | 3426103 A1 | 1/1986 |
| DE | 3149345 C2 | 1/1989 |
| DE | 202005019542 U1 | 2/2006 |
| EP | 0012097 A2 | 6/1980 |
| EP | 0015803 A2 | 9/1980 |
| EP | 0106162 A1 | 4/1984 |
| EP | 0153210 A1 | 8/1985 |
| EP | 0155114 A2 | 9/1985 |
| EP | 0293340 A2 | 11/1988 |
| EP | 0359134 A2 | 3/1990 |
| EP | 0485956 A1 | 5/1992 |
| EP | 0516013 A2 | 12/1992 |
| EP | 0516013 A3 | 12/1992 |
| EP | 0619219 | 10/1994 |
| EP | 0826587 | 3/1998 |
| EP | 0894446 A1 | 2/1999 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2932450 A1 | 12/2009 |
| JP | 64-23202 | 7/1989 |
| JP | 05111402 | 5/1993 |
| JP | H11-103902 | 4/1999 |
| JP | 2005-46629 | 2/2005 |
| TW | 368973 | 9/1999 |
| TW | 392662 | 6/2000 |
| TW | 200303278 | 9/2003 |
| TW | M293881 | 7/2006 |
| TW | 1308543 | 4/2009 |
| WO | WO2004089741 | 10/2004 |

OTHER PUBLICATIONS pearlizumi.com, PI Aero Lycra Shoe Cover, www.pearlizumi.com/product.pjp?mode=view&pc_id=50&product_id=193110.
Frog Pedal Specifications, www.speedplay.com.
Speedplay brochure.
International Search Report for International Application No. PCT/US2010/056057.
International Preliminary Report on Patentability for International Application No. PCT/US2010/056057.
European Search Report for Application No. 13190753.7-1753.
Office Action for Japanese Patent Application No. 2011-540875.

* cited by examiner

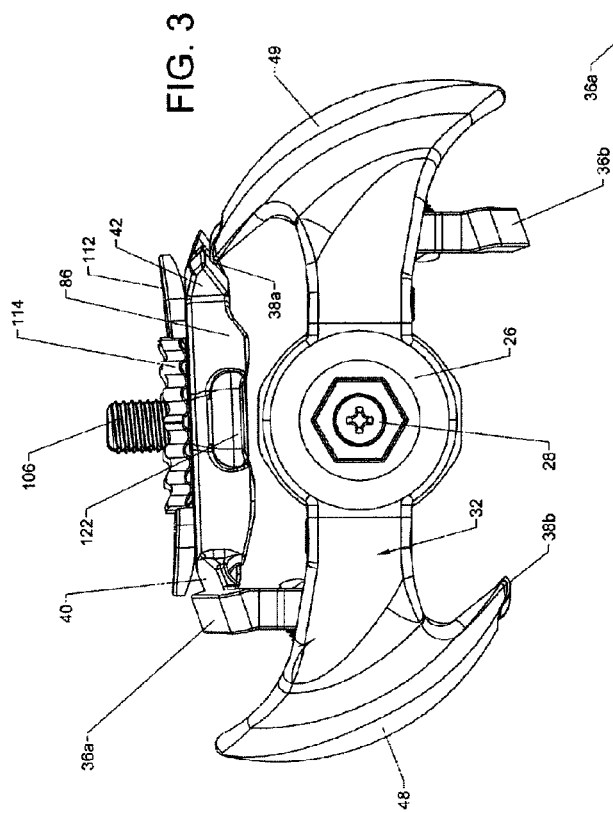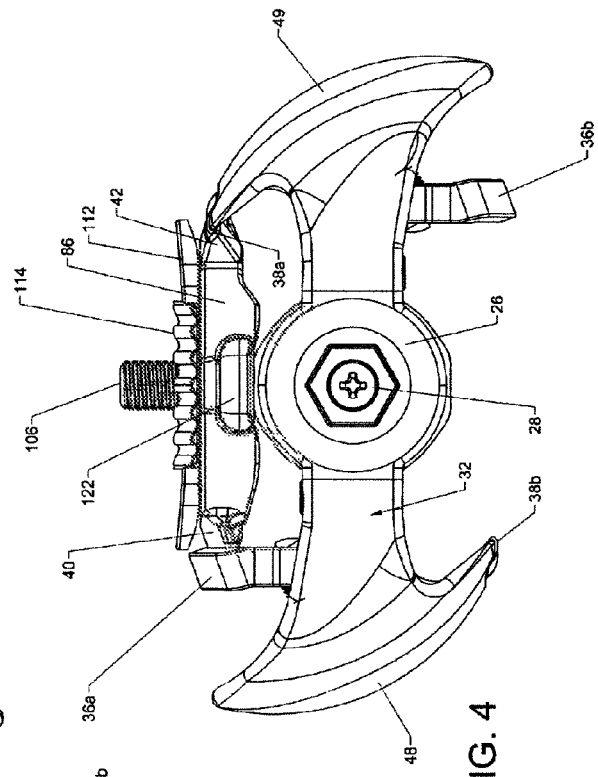

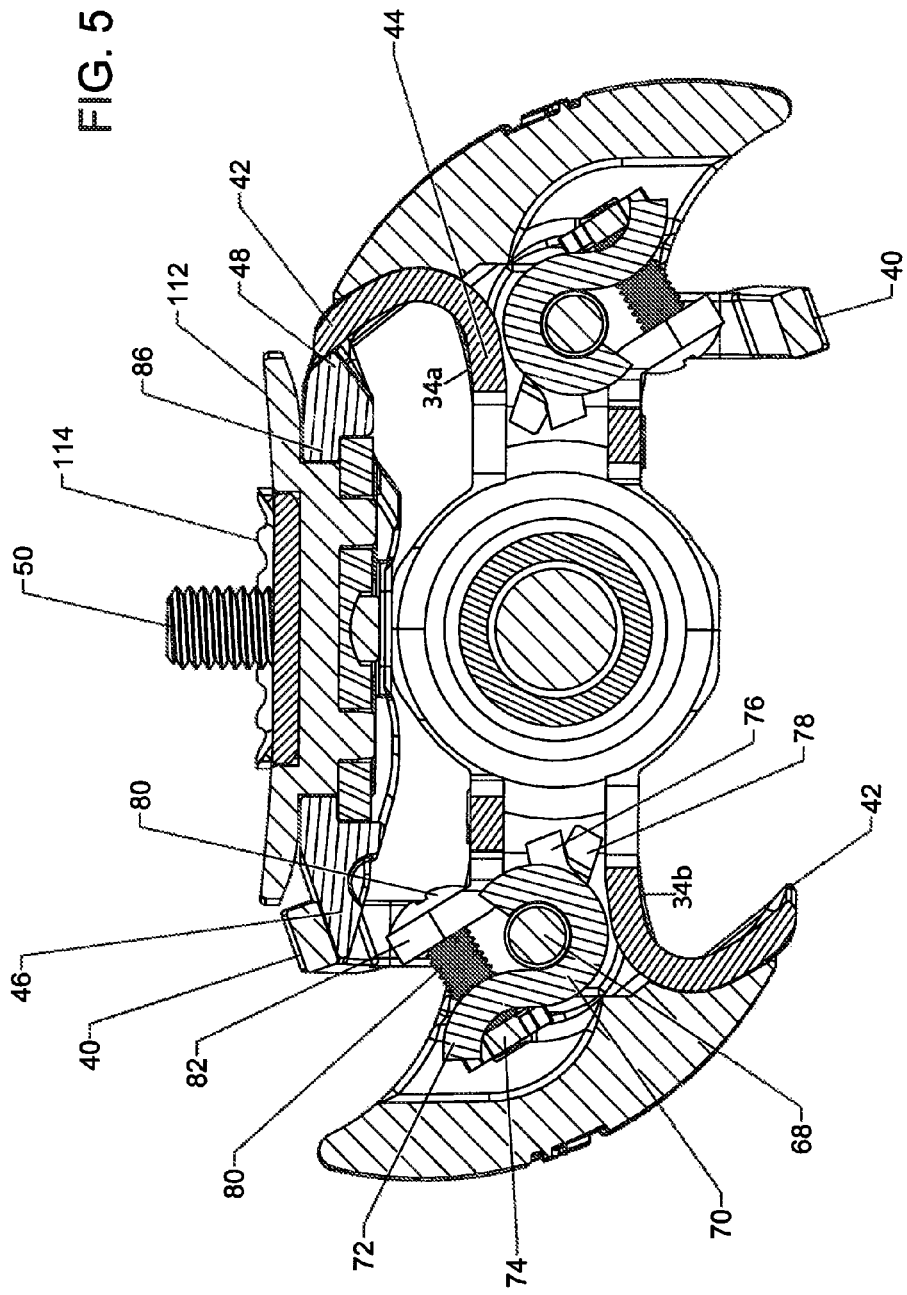

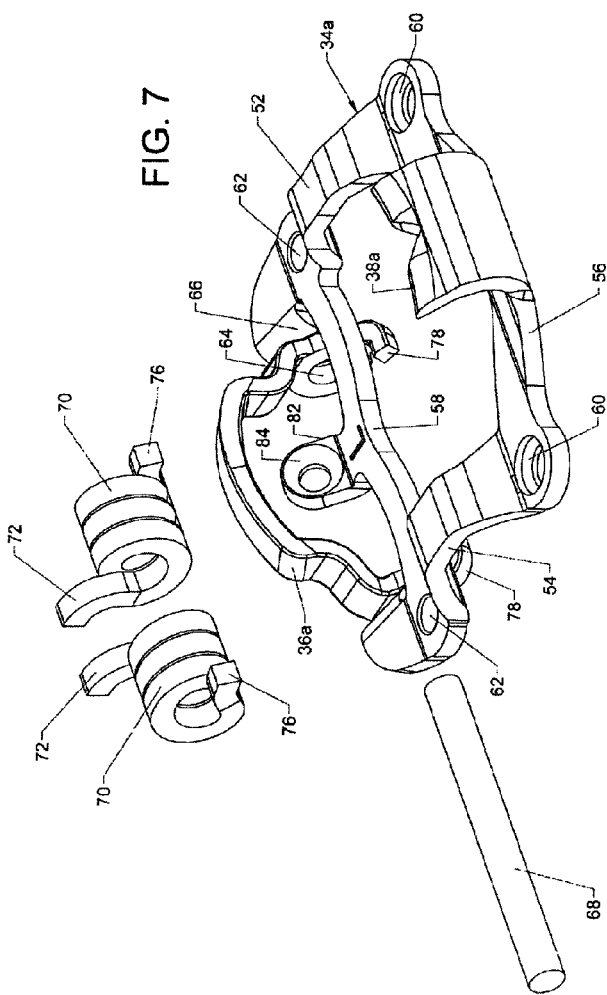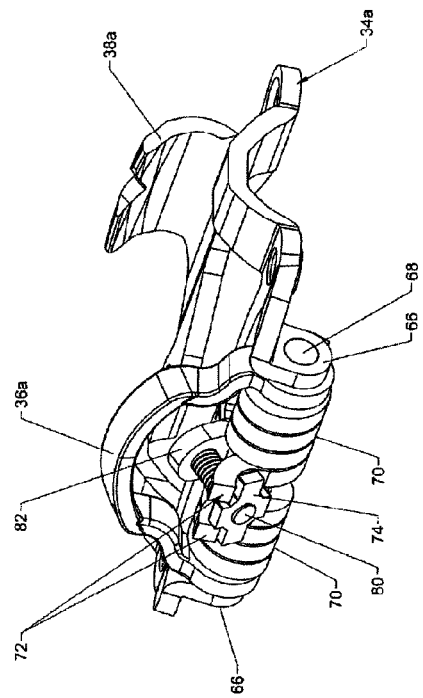

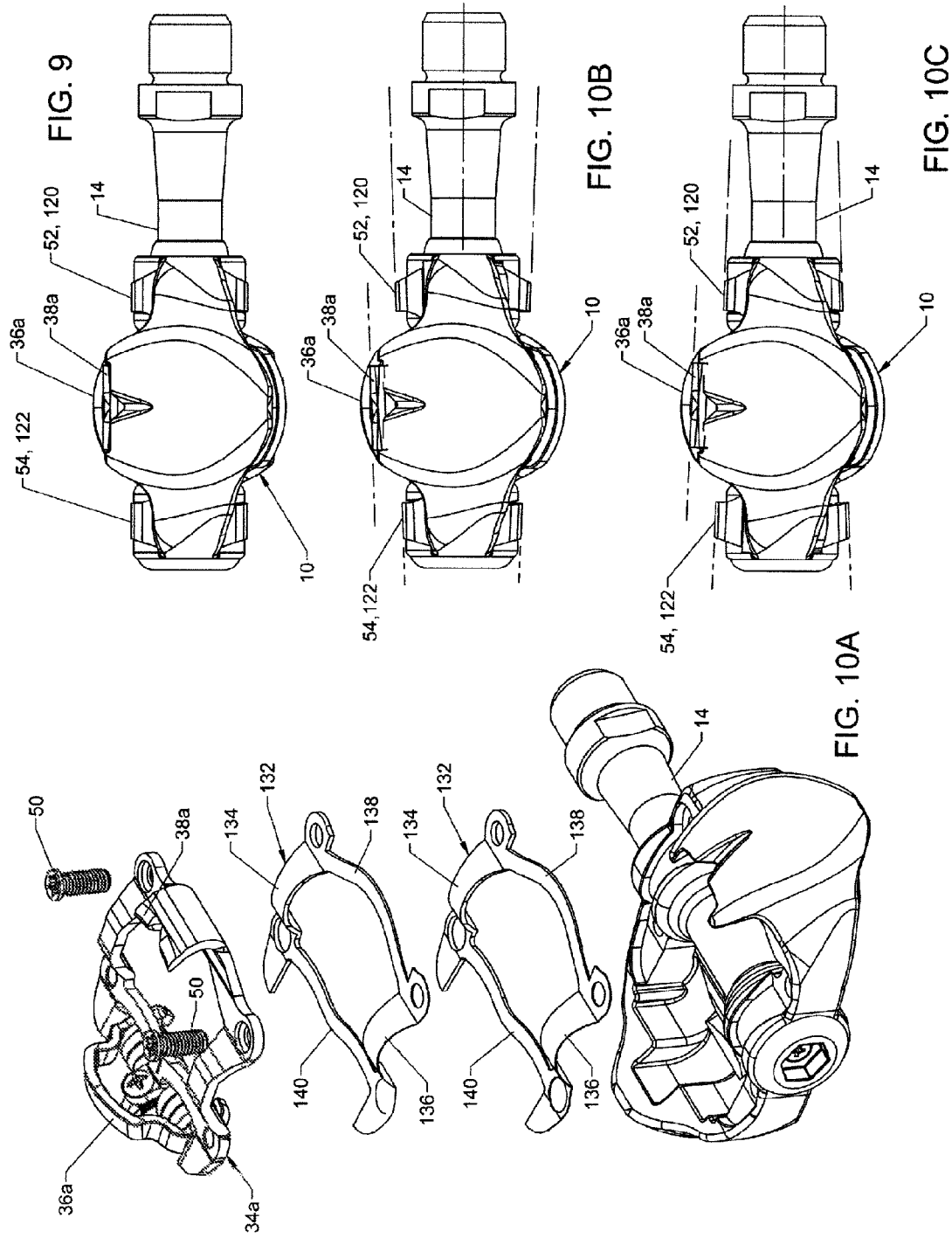

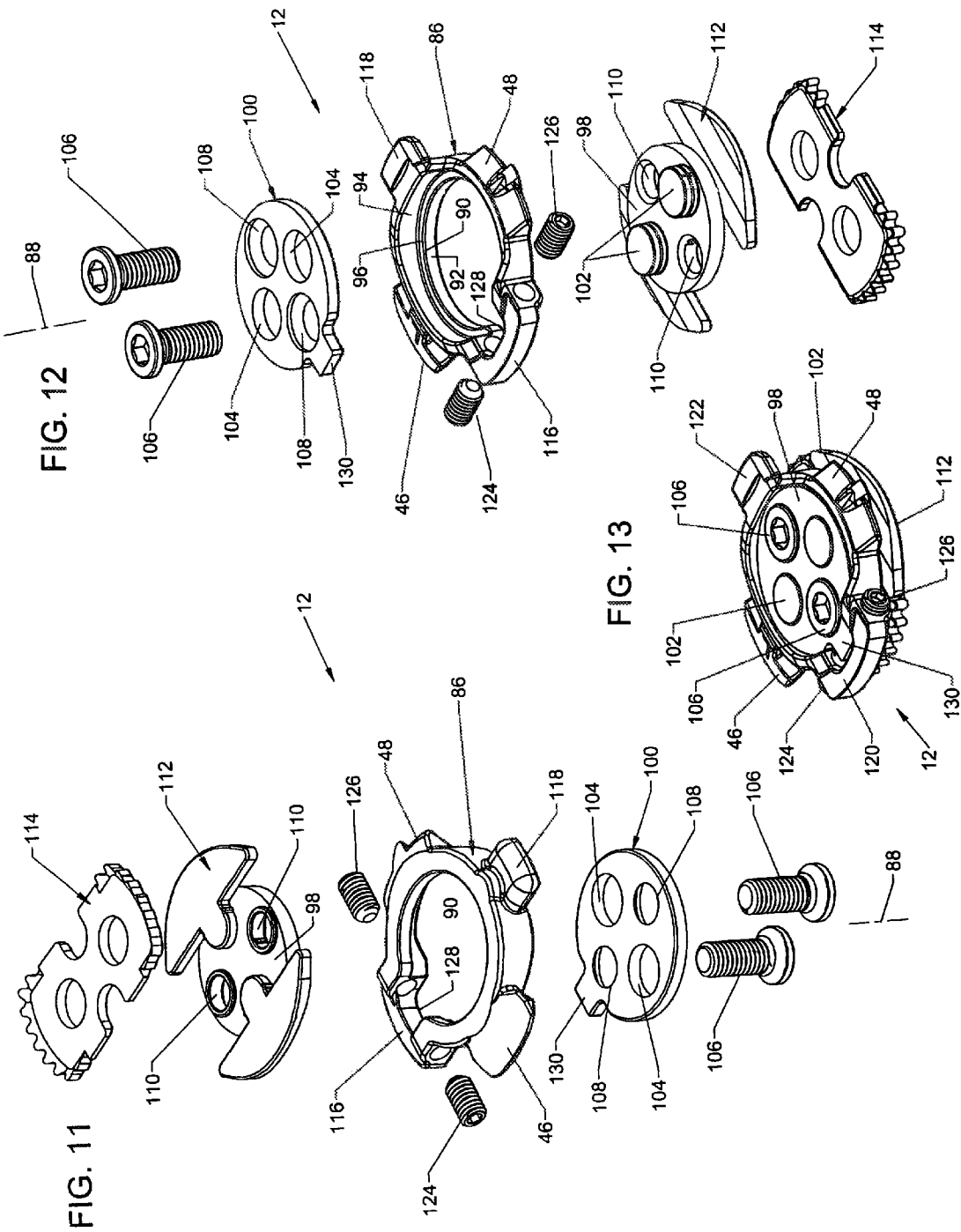

PEDAL-CLEAT ASSEMBLY

BACKGROUND OF THE INVENTION

This invention relates generally to pedals for use on bicycles and the like, and, more particularly, to clipless pedal/cleat assemblies of a kind including a pedal assembly that releasably secures a cleat attached to the sole of a rider's shoe.

Clipless pedal assemblies of this particular kind commonly include a main pedal body having forward and rearward cleat retainers mounted on its upper side. These cleat retainers are configured to be forcibly retractable apart from each other, against the yielding bias of a spring-bias device, or spring mechanism, to receive and releasably secure forward and rearward projections that are part of a cleat attached to the sole of a rider's shoe. The rider can release the cleat and shoe from the pedal assembly simply by rotating the shoe by a predetermined angular amount, about an axis perpendicular to the pedal body's upper side. This causes cam surfaces on the cleat to engage the forward and rearward cleat retainers and forcibly urge them apart from each other, against the yielding bias of the spring mechanism, to release the retainers' retention of the cleat.

Typically in the past, the pedal assembly's forward cleat retainer has been fixed relative to the pedal body and its rearward cleat retainer has been yieldably biased toward the forward cleat retainer by the spring mechanism. This arrangement works satisfactorily in most situations, but it is vulnerable to at least one serious problem. When the rider vigorously pushes downwardly on one pedal while pulling upwardly on the other pedal, the upward pull can sometimes overcome the bias provided by the spring mechanism and release the cleat and shoe from the pedal assembly. This, in turn, can potentially lead to serious injury of the rider. Moreover, even if the rider does not pull upwardly with sufficient force to release the cleat from the pedal assembly, any yielding by the spring mechanism absorbs and wastes energy. The severity of this problem can be reduced by increasing the force provided by the spring mechanism, but this will inherently make it more difficult to engage/disengage the cleat with/from the pedal assembly.

Another problem with typical pedal/cleat assemblies of the past has arisen because the rider's shoe typically has been secured to the pedal assembly not only by the engagement of the cleat's forward and rearward projections with the pedal assembly's forward and rearward cleat retainers, but also by the contact of lugs on the inboard and outboard sides of the shoe's sole with inboard and outboard sides of the pedal body. The involvement of portions of the rider's shoe sole in this securement can render the connection vulnerable to variations in the design and manufacturing tolerances of the shoe, which can lead to undesired vertical play or interference incompatibilities. The involvement of portions of the rider's shoe sole in this securement also can make it difficult to tailor the pedal/cleat assembly to accommodate riders having certain biomechanical issues, e.g., leg-length discrepancies and varus (knock-kneed) and valgus (bow-legged) tilt.

Yet another problem with typical pedal/cleat assemblies of the past relates to the stability of the rider's shoe on the pedal assembly, both in terms of comfort and optimal power transfer. In particular, the cleat's projections and pedal assembly's cleat retainers have needed to be precisely sized and configured, to ensure that they allow a minimum of vertical movement between them. Moreover, because of wear over time, the engagement between the cleat projections and the cleat retainers can deteriorate and allow for undesired vertical movement, or play, between the cleat and the pedal assembly.

It should, therefore, be appreciated that there is a continuing need for an improved pedal/cleat assembly that securely and stably couples the cleat to the pedal assembly without relying on portions of the rider's shoe sole, that reduces the possibility of the rider inadvertently pulling the cleat out of engagement with the pedal assembly, that allows for a convenient and precise ergonomic adjustment to accommodate riders having various biomechanical issues such as leg-length discrepancy and varus or valgus tilt, and that minimizes the possibility of undesired vertical play between the cleat and pedal assembly even after extended use and wear. The present invention fulfills these needs and provides further related advantages.

SUMMARY OF THE INVENTION

The present invention is embodied in an improved pedal/cleat assembly that can securely couple a cleat to a pedal assembly without relying on portions of the sole of a rider's shoe. More particularly, the cleat is configured for attachment to the underside of the rider's shoe and it includes (1) a forward cleat projection facing a toe end of the shoe, (2) a rearward cleat projection facing a heel end of the shoe, (3) an inward foot located on a portion of the cleat nearest an inward side of the shoe, and (4) an outward foot located on a portion of the cleat nearest an outward side of the shoe. The pedal assembly is configured to releasably secure the cleat, and it includes (1) a spindle, (2) a main pedal body mounted on the spindle for rotation about a spindle axis and having an upper side facing the cleat, (3) an upper cleat support base mounted to the upper side of the main pedal body, (4) a set of forward and rearward cleat retainers secured to, and projecting upward from, the upper cleat support base, respectively forward and rearward of the spindle, to receive and retain the respective forward and rearward cleat projections, and (5) a spring-bias device for yieldably biasing the forward and rearward cleat retainers toward each other. The upper cleat support base includes inward and outward pads configured to support the cleat's respective inward and outward feet when the cleat is secured to the pedal assembly. The pedal/cleat assembly thereby is configured such that the cleat can be secured to the pedal assembly without reliance on any portion of the rider's shoe. Rotation of the cleat about a cleat rotation axis, when the cleat is secured to the pedal assembly, forcibly moves the forward and rearward cleat retainers apart from each other, against the yielding bias of the spring-bias device, to release the cleat from the pedal assembly.

In a more detailed feature of the invention, the pedal assembly further comprises one or more shims selectively disposed between the main pedal body and the upper cleat support base, for modifying the positions of the forward and rearward cleat retainers and/or the inward and outward pads relative to the main pedal body without affecting the engagement of the cleat with the pedal assembly. At least one of the one or more shims can have a wedge-like thickness profile, for modifying the valgus or varus tilt of the upper cleat support base. Alternatively, or additionally, at least one of the one or more shims has a uniform thickness profile, for modifying the height of the upper cleat support base relative to the main pedal body.

In another more detailed feature of the invention, the upper cleat support base is a single unitary body. In addition, the rearward cleat retainer is fixed relative to the upper cleat support base, the forward cleat retainer is mounted to the upper cleat support base for movement toward and away from the rearward cleat retainer, and the spring-bias device yieldably biases the forward cleat retainer toward the rearward cleat retainer. The forward cleat retainer can be mounted for pivoting movement about a pivot axis parallel with the spindle axis, and the spring-bias device can comprise a helical coil section having an axis aligned with the pivot axis of the forward cleat retainer. Such helical coil section can include a first end coupled to the forward cleat retainer and a second end coupled to the upper cleat support base. This coupling of the second end of the helical coil section can be accomplished using a spring tension adjuster configured to adjust the helical coil section's resistance to pivoting movement of the forward cleat retainer in a direction away from the rearward cleat retainer.

In one optional embodiment, the pedal assembly can be double-sided. In this embodiment, the pedal assembly further include a lower cleat support base mounted to the underside of the main pedal body, a second set of forward and rearward cleat retainers secured to, and projecting downward from, the lower cleat support base, and a second spring-bias device for yieldably biasing the forward and rearward cleat retainers of the second set toward each other. The two cleat support bases can be secured to the main pedal body using screws that pass through holes formed the main pedal body to engage threaded holes formed in the cleat support bases.

In a separate and independent feature of the invention, the cleat and the pedal assembly are configured to ensure that the cleat is automatically urged downward into compressive engagement with the pedal assembly. In particular, the forward and rearward cleat projections each have an upper engagement surface, and the forward and rearward cleat retainers each have a lower retainer surface. These surfaces are configured such that the yielding bias provided by the spring-bias device also biases the cleat downward into compressive engagement with the pedal body. Preferably, the upper engagement surfaces both have downward slopes and the lower retainer surfaces both are complementarily sloped so as to substantially conform with the upper engagement surfaces.

In another separate and independent feature of the invention, the pedal assembly is configured to reduce energy waste and reduce the possibility of the rider inadvertently pulling the cleat out of engagement with the pedal assembly. In particular, this is achieved by configuring the rearward cleat retainer to be fixed relative to the main pedal body and by configuring the forward cleat retainer to be movable toward and away from the rearward cleat retainer. The spring-bias device yieldably biases the forward cleat retainer to move toward the rearward cleat retainer, e.g., by pivoting about a forward cleat retainer axis.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 3 is a side elevational view of the pedal assembly of FIG. 1, shown with a cleat assembly being inserted for engagement with the pedal assembly's forward and rearward cleat retainers.

FIG. 4 is a side elevational view of the pedal assembly of FIG. 1, shown with the cleat assembly in its fully inserted and secured position.

FIG. 5 is a side sectional view of the pedal/cleat assembly of FIG. 3, with the cleat assembly in its fully inserted and secured position.

FIG. 7 is an exploded top, rear perspective view of the upper cleat support base, forward cleat retainer, pin and one coil spring, useful in showing how the forward cleat retainer is secured to the upper cleat support base.

FIG. 8 is a bottom, front perspective view of the upper cleat support base and forward cleat retainer in their fully assembled condition.

FIG. 9 is a rear elevational view of the pedal assembly of FIG. 1, showing no elevational or angular adjustment to its inward and outward support pads.

FIG. 10A is an exploded top, rear perspective view of the pedal assembly of FIG. 1, shown with its upper cleat support base positioned and two angled shims positioned above the main pedal body.

FIG. 10B is a rear elevational view of the pedal assembly of FIG. 1, showing a 2-degree valgus tilt to its inward and outward support pads provided by two wedge-shaped shims.

FIG. 10C is a rear elevational view of the pedal assembly of FIG. 1, showing a 2-degree varus tilt to its inward and outward support pads provided by two wedge-shaped shims.

FIG. 11 is a top, front exploded perspective view of the cleat assembly of FIG. 1.

FIG. 12 is a bottom, front exploded perspective view of the cleat assembly of FIG. 11.

FIG. 13 is a rear perspective view of the underside of the cleat assembly of FIG. 11, shown in its fully assembled condition.

DESCRIPTION OF THE PREFERRED EMBODIMENT

Figure 1:
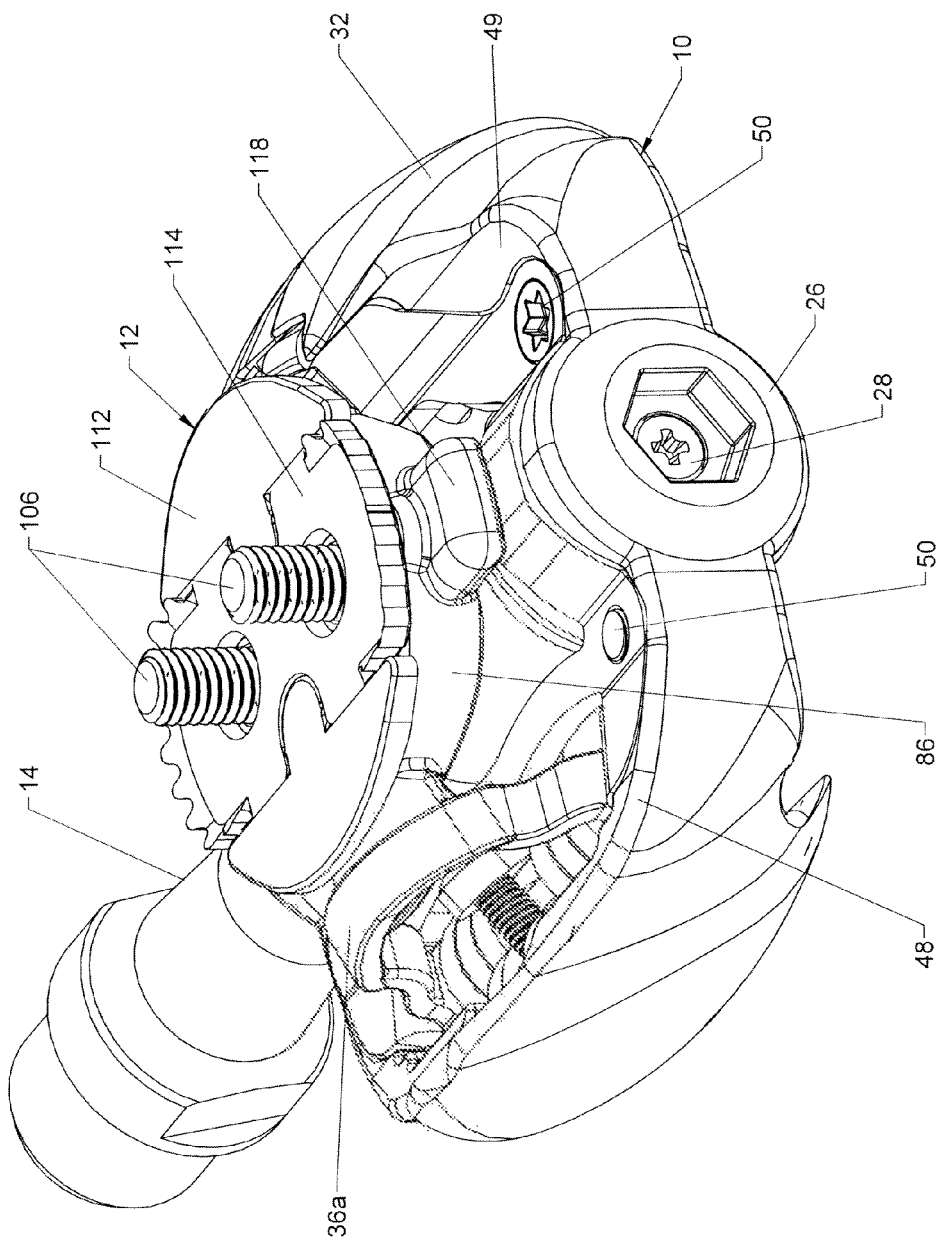
FIG. 1 is a top, front perspective view of a pedal/cleat assembly embodying the invention.

With reference now to the illustrative drawings, and particularly to FIGS. 1-6, there is shown a bicycle pedal/cleat assembly embodying the invention, including a pedal assembly 10 and an associated cleat assembly 12. The cleat assembly is secured to the underside of the sole of a rider's shoe (not shown), and it is configured to be attachable to the pedal assembly in a manner that allows limited rotational movement, but to be released from that attachment if the rotational movement exceeds a selected angular amount. The pedal assembly is double-sided, meaning that the cleat assembly can be releasably secured to either of its two sides. Only a left-side pedal/cleat assembly is shown in the drawings and discussed below, although it will be understood that a similar, mirror-image pedal/cleat assembly can be located on the bicycle's right side. It also will be understood that the invention alternatively could be embodied in a pedal assembly having only a single side configured to releasably secure the cleat assembly.

Figure 2:
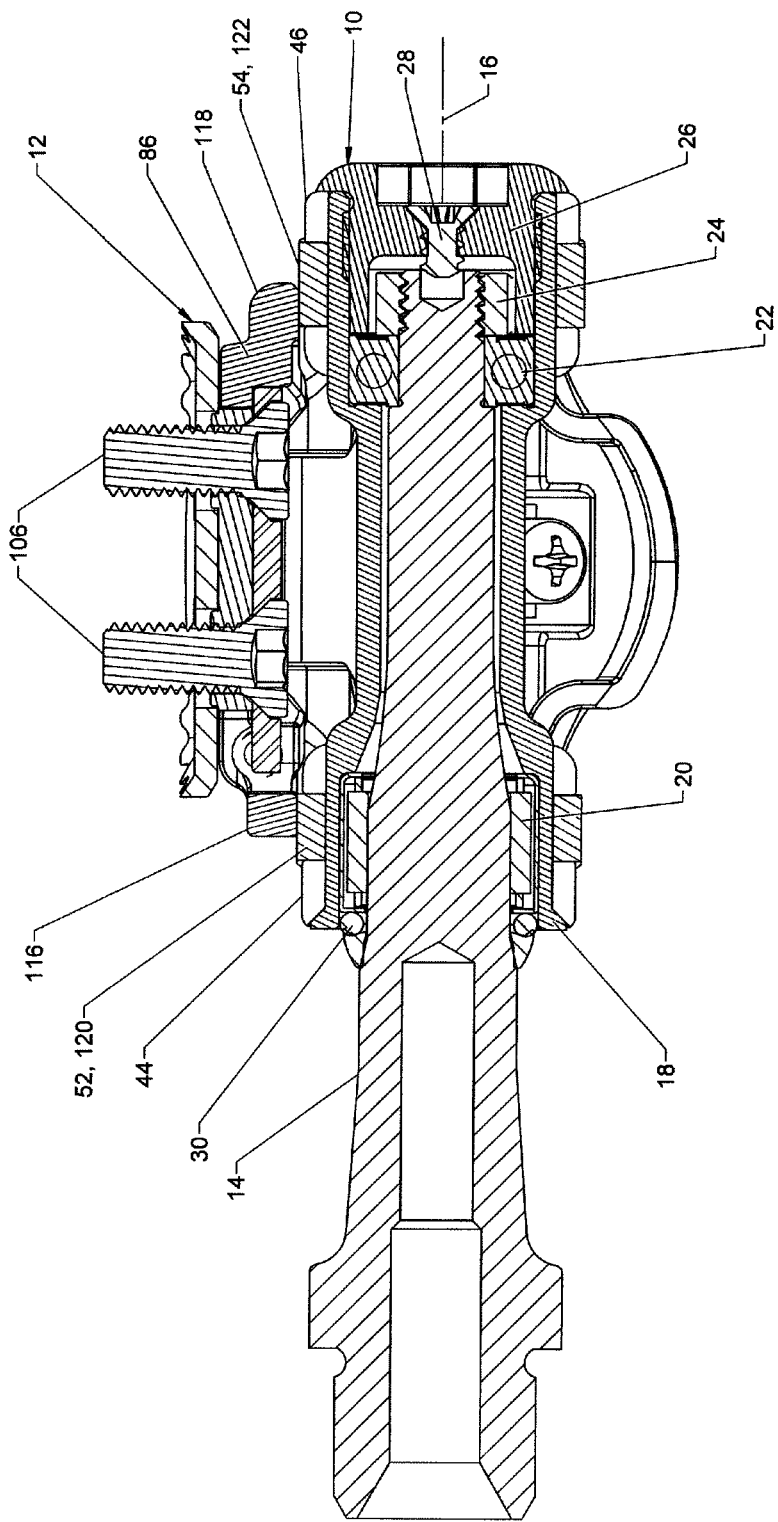
FIG. 2 is a sectional view of the pedal/cleat assembly of FIG. 1, taken substantially along the spindle axis.

With particular reference to FIGS. 1 and 2, the pedal assembly 10 is shown to include an elongated spindle 14 that projects laterally from a bicycle crank (not shown). The spindle is rotatable about a spindle axis 16 oriented to be parallel with the crank's rotation axis. A bearing sleeve 18 is mounted at the remote end of the spindle, for rotation relative to the spindle. This mounting is accomplished using a needle bearing 20 at the bearing sleeve's inner end and a cartridge ball bearing 22 at the bearing sleeve's outer end. A nut 24 is threaded to the spindle's outer end, and a threaded end cap 26 and a screw 28 secure the components in place. Temporarily removing the screw 28 allows grease to be injected into the pedal assembly's interior. An O-ring 30 is located on the spindle 14, to seal the inner end of the needle bearing.

With reference again to all of FIGS. 1-6, the pedal assembly 10 is shown to include a main pedal body 32, with identical upper and lower cleat support bases 34a, 34b mounted on its opposite sides. (The lower cleat support base 34b is visible only in FIGS. 2 and 5.) This forms a sandwich-like assembly, with the main pedal body functioning as a spacer between the two cleat support bases. The upper cleat support base 34a, in turn, mounts a forward cleat retainer 36a and a rearward cleat retainer 38a, to form a seat for receiving and retaining forward and rearward cleat projections 40, 42, respectively, of the cleat assembly 12. In identical fashion, the lower cleat support base 34b mounts a forward cleat retainer 36b and a rearward cleat retainer 38b, to form a seat for receiving and retaining the same forward and rearward cleat projections.

More particularly, the main pedal body 32 is a single, unitary structure that includes inward and outward rings 44, 46 mounted on the bearing sleeve 18 and that further includes a pair of identical U-shaped bodies 48, 49 spanning from one ring to the other, on diametrically opposed sides of the two rings. In FIG. 1, the U-shaped body 48 is oriented in a forward direction and the U-shaped body 49 is oriented in a rearward direction. The main pedal body 32 preferably is formed as one integral body of a composite thermoplastic material such as nylon or polyurethane, or other suitable lightweight, but strong material.

The upper and lower cleat support bases 34a, 34b are secured to the opposite sides of the unitary main pedal body 32 by four screws 50 (FIG. 1). Two of these screws extend downward through unthreaded holes formed in the upper cleat support base 34a and in the main pedal body, to engage threaded holes formed in the lower cleat support base 34b; and the other two screws extend upward through unthreaded holes formed in the lower cleat support base and in the main pedal body to engage threaded holes formed in the upper cleat support base.

As mentioned above, the forward and rearward cleat retainers 36a, 38a, which project upward from the upper cleat support base 34a, are configured to receive and retain the respective forward and rearward cleat projections 40, 42 of the cleat assembly 12. In identical fashion, the forward and rearward cleat retainers 36b, 38b, which project downward from the lower cleat support base 34b are configured to receive and retain the same forward and rearward projections of the cleat assembly. In use, as is conventional with double-sided pedal assemblies, the rider causes the cleat assembly to engage whichever pair of cleat retainers is most conveniently accessed. The U-shaped bodies 48, 49 are specially sloped to help the rider rotate the pedal assembly 10 to an orientation that facilitates the engagement.

In the following description, only the structure on the upper side of the pedal assembly 10 will be described, and it will be understood that the structure of the pedal assembly's underside is identical to it. It also will be understood that the pedal assembly could be single-sided and omit the cleat retainer structure on one of its sides.

Viewed from above, the upper cleat support base 34a has a generally square shape, with an open middle portion, and with an inward arch 52 that extends over the inward ring 44, an outward arch 54 that extends over the outward ring 46, a rearward crosslink 56 that interconnects the rearward ends of the inward and outward arches, and a forward crosslink 58 that interconnects the forward ends of the inward and outward arches. Countersunk holes 60 are formed at the intersections of the inward and outward arches with the rearward crosslink, to receive the heads of the screws 50 that secure the upper cleat support base to the upper side of the main pedal body 32. Threaded holes 62 are formed at the intersections of the inward and outward arches with the forward crosslink, to receive the threaded shanks of corresponding screws 50 that secure the lower cleat support base 34b to the underside of the main pedal body.

As mentioned above, the forward cleat retainer 36a and rearward cleat retainer 38a, which project upward from the upper cleat support base 34a, are configured to form a seat to receive and retain the respective forward and rearward projections 40, 42 of the cleat assembly 12. The rearward cleat retainer is integral with, and thus fixed relative to, the upper cleat support base, but the forward cleat retainer is pivotally mounted to the plate and spring-biased toward the rearward cleat retainer. The forward and rearward cleat retainers 36a, 38a preferably are formed of a hard, non-resilient material such as hardened steel, or a similar hard metal.

Figure 6:
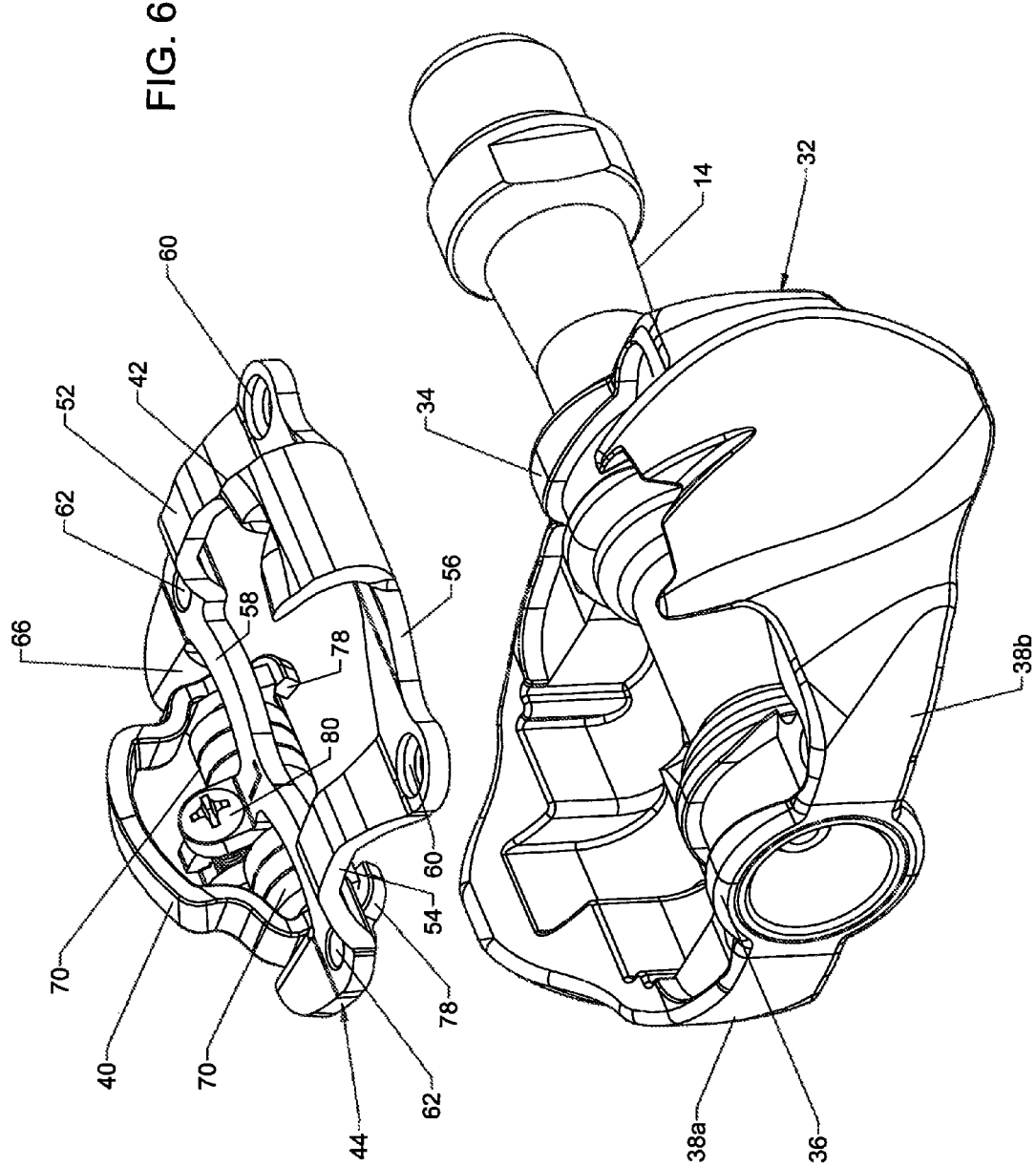
FIG. 6 is an exploded top, rear perspective view of the pedal assembly of FIG. 1, shown with its upper cleat support base positioned above the main pedal body.

More particularly, and as best shown in FIGS. 6-8, the forward cleat retainer 36a is generally U-shaped, with holes 64 at its two ends that register with holes (not shown) formed in flanges 66 that depend from forward extensions of the upper cleat support base's inward and outward arches 52, 54. A pin 68 extends through these four aligned holes, to limit movement of the forward cleat retainer to pivoting about the pin axis. A pair of coil springs 70 are mounted end-to-end on the pin, for biasing the forward cleat retainer 36a toward the rearward cleat retainer 38a. The adjacent, or near, ends of the two springs include fingers 72 that engage a stop plate 74, to rotationally anchor those ends of the springs. The other ends of the two springs, i.e., the remote ends, include fingers 76 that engage fingers 78 projecting inward from the ends of the forward cleat retainer. This arrangement biases the forward cleat retainer in a rearward direction, toward the rearward cleat retainer 38a. Those skilled in the art will understand that other types of spring mechanisms alternatively could be used, e.g., non-coil springs and elastomers. The forward cleat retainer is prevented from moving excessively rearward by its engagement with the forward crosslink 58 of the upper cleat support base 34a.

Controlled adjustability of the amount of spring bias applied by the coil springs 70 to the forward cleat retainer 36a is provided by an adjustment screw 80 interconnecting the stop plate 74 with a flange 82 that projects forward from a mid-portion of the forward crosslink 58 of the upper cleat support base 34a. A countersunk hole 84 formed in the flange receives the head of the adjustment screw, and the screw's threaded shank is received in a threaded bore formed in the stop plate. Controllably rotating the adjustment screw effectively moves the stop plate upward or downward relative to the forward crosslink, like a jack, to tighten or loosen the spring tension. This provides a controlled adjustment of spring tension.

With reference now to FIGS. 11-13, the cleat assembly 12 is shown to include a generally ring-shaped main cleat body 86 that defines the forward cleat projection 40 and the rearward cleat projection 42. These projections are sized and configured to engage and be retained by the respective forward and rearward cleat retainers 36a, 38a of the pedal assembly 10. As will be described below, the cleat assembly further includes additional structure that allows the main cleat body, and its forward and rearward projections, to rotate by a selected, limited amount relative to the rider's shoe about a cleat rotation axis 88 generally perpendicular to the shoe sole, before the cleat assembly begins to disengage from the pedal assembly 10. This provides the user a selected "float" angle.

To this end, the main cleat body 86 defines a stepped circular opening 90 in its central region, which includes a smaller diameter portion 92 nearest the shoe sole and a larger diameter portion 94 furthest from the shoe sole. A ring-shaped ledge 96 thereby is defined between the two diameter portions. A first rotatable disc-shaped body 98 is located within the smaller diameter portion, and a second rotatable disc-shaped body 100 is located within the larger diameter portion. The first disc-shaped body 98 includes two circular bosses 102 that seat in two circular holes 104 formed in the second disc-shaped body 100. The two disc-shaped bodies thereby mate with each other, and are rotatable together as a unit relative to the main cleat body.

The main cleat body 86 and the first and second disc-shaped bodies 98, 100 are secured to the sole of rider's shoe by two screws 106 that extend through holes 108 formed in the second disc-shaped body 100 and holes 110 formed in the first disc-shaped body 98. These holes are aligned along axes perpendicular to the bosses 102 and holes 104. A spacer 112 and a base plate 114 are located between the main cleat body and the sole of the rider's shoe (not shown). The base plate 114, which is configured to nest within an elongated central opening formed in the spacer 112, includes two apertures for allowing the shanks of the screws 106 to pass through and engage threaded holes formed in the shoe sole and also includes teeth 115 for biting into the shoe sole when the screws are tightened. The holes 108, 110 formed in the respective second and first disc-shaped bodies 100, 98 are countersunk to receive the heads of the two screws.

In this manner, the screws 106 securely fasten the spacer 112, the base plate 114, the first disc-shaped body 98, and the second disc-shaped body 100 to the underside of the shoe sole. The main cleat body 86, however, is free to rotate by a limited amount relative to the two disc-shaped bodies, about the cleat rotation axis 88. The stepped circular opening 90 in the central region of the main cleat body is sized to avoid any significant frictional engagement between the second disc-shaped body 100 and the opening's ring-shaped ledge 96.

The rider engages the cleat assembly 12 with the pedal assembly 10 by inserting the cleat assembly's forward cleat projection 40 into the space beneath whichever of the two U-shaped forward cleat retainers 36a, 36b is more conveniently oriented and by then pressing the cleat assembly's rearward cleat projection 42 downward against the pedal assembly's rearward cleat retainer 38a, 38b. The abutting surfaces of the rearward cleat projection and the rearward cleat retainer are appropriately beveled, such that the downward pressure forces the forward cleat retainer in a forward direction, against the yielding bias of the coil springs 70. Eventually, the forward cleat retainer will have retracted sufficiently forward to allow the rearward cleat projection to snap into position beneath the rearward cleat retainer, whereupon the springs forcibly return the forward cleat to a rearward position to lock the cleat assembly in place.

When the cleat assembly 12 is engaged with the pedal assembly 10, inward and outward lateral feet, or projections 116, 118 formed in the cleat assembly's main cleat body 86 rest atop support pads 120, 122 defined in the respective inward and outward arches 52 and 54 of the upper cleat support base 34a. This configuration ensures that the entire engagement between the shoe and the pedal assembly is provided by the cleat assembly, and not any portion of the shoe sole. This minimizes the possibility that any contact by the sole will adversely affect the engagement.

One important advantage is provided by configuring the pedal assembly 10 to have a fixed rearward cleat retainer 38a, but a retractable forward cleat retainer 36a. This advantage arises when a rider vigorously pushes downwardly on one pedal while pulling upwardly on the other pedal. The foot that is pushing downwardly ordinarily will be substantially horizontal, such that the downward force is applied by the cleat assembly 12 directly to the two support pads 120, 122 defined in the upper cleat support base 34a. The foot that pulls upwardly, on the other hand, ordinarily will be oriented with the heel well above the toe. In this orientation, the pedal automatically pivots forward and upward force is applied by the cleat assembly 12 to the rearward cleat retainer 38a. Because the rearward cleat retainer is fixed, not retractable, this upward force does not function to pull the two cleat retainers apart from each other.

This configuration thus minimizes the possibility of the rider unintentionally disengaging the cleat assembly 12 from the pedal assembly 10, with disastrous consequences. In addition, this configuration prevents any energy waste that occurs when a spring-biased cleat retainer is needlessly retracted by even a small amount. It also allows the spring tension to be reduced without adversely affecting the securement of the cleat assembly, thus making it easier for the rider to engage/disengage the cleat assembly with/from the pedal assembly.

The pedal assembly 10 and cleat assembly 12 also provide another important advantage, relating to stability of the rider's shoe on the pedal assembly. In particular, and with reference to FIGS. 3-5 and 11, it is noted that the upper engagement surfaces of the cleat assembly's forward cleat projection 40 and rearward cleat projection 42 are configured to slope downward, and the mating lower retainer surfaces of the forward cleat retainer 34a and rearward cleat retainer 36a are configured to have a complementary downward slope. Because of this configuration, the rearward spring-bias provided by the forward cleat retainer translates to a downward force on the cleat assembly. This forces the cleat assembly's lateral projections 116 and 118 into compressive engagement with the pedal assembly's support pads 120 and 122, thus eliminating the undesired occurrence of vertical movement, or play, between the cleat assembly and pedal assembly. Moreover, this downward compressive engagement is provided despite any wear of the cleat projections and the cleat retainers.

It will be appreciated that this downward compressive engagement between the cleat assembly 12 and the pedal assembly 10 alternatively could be provided even if just one surface of the two mating pairs of engagement and retainer surfaces is configured to have a downward slope. All four mating surfaces need not be sloped. If any one or more of these mating surfaces is sloped in the manner described and shown, then the rearward spring-bias provided by the forward cleat retainer 34a will inherently be translated by the slope into a downward bias toward the pedal assembly's upper cleat support base 34a.

With reference again to FIGS. 11-13, the amount of pedal float is controllably adjustable using forward and rearward set screws 124 and 126, which are carried within threaded bores formed in the inward lateral projection 116 of the main cleat body 86. These set screws project into a cutout region 128 of the main cleat body, adjacent to the second disc-shaped body 100. A finger 130 projects radially outward from the second disc-shaped body 100 into the cutout region, for engagement with the ends of the forward and rearward set screws. The forward set screw 124 limits counterclockwise rotation of the main cleat body relative to the disc-shaped body; this corresponds to heel-in rotation of the rider's shoe relative to the pedal assembly. The rearward set screw 126, on the other hand, limits clockwise rotation of the main cleat body relative to the disc-shaped body; this corresponds to heel-out rotation of the rider's shoe relative to the pedal assembly 10. The special shape of the finger 130 can be manufactured conveniently using a stamping process.

The cutout region 128 is sized to allow an optimum float of up to about 5° in either rotational direction. A maximum float is provided by retracting the set screws 124 and 126 fully into their respective threaded bores. On the other hand, a minimum float (i.e., zero float) is provided by extending the set screws fully into the cutout region to abut against the finger's two sides. Of course, any amount of float between zero and the maximum can be selected simply by adjustably positioning the set screws.

In its locked position, the cleat assembly 12 is free to rotate clockwise or counterclockwise relative to the pedal assembly 10 by whatever float has been selectively provided using the set screws 124 and 126. Throughout this limited angular movement, the cleat assembly remains locked to the pedal assembly. If the cleat assembly is rotated by more than the selected float, either clockwise (heel out) or counterclockwise (heel in), cam surfaces on the cleat assembly's forward cleat projection 40 and rearward cleat projection 42 will forcibly urge the respective forward and rearward cleat retainers 34a and 36a apart from each other, against the yielding bias of the coil springs 70. Eventually, the two cleat retainers will be moved apart sufficiently to release their retention of the two projections. This releases the cleat assembly from the pedal assembly.

The pedal assembly 10 also is configured to provide a convenient adjustability to accommodate riders having a variety of biomechanical issues, including leg-length discrepancies and varus (knock-kneed) and valgus (bow-legged) tilt. With particular reference to FIGS. 10A-10C, the pedal assembly further includes a plurality of shims that can be used to accomplish this adjustability. Two such shims are depicted in the identified drawings, represented by the reference numeral 132. Viewed from above, each shim has a size and shape corresponding to that of the upper cleat support base 34a, i.e., a generally square shape with an open central region. Specifically, each shim includes an inward arch 134, an outward arch 136, a rearward crosslink 138, and a forward crosslink 140. Holes are provided at the intersections of the arches with the crosslinks, to accommodate the attachment screws 50. In use, the shims are sandwiched between the main pedal body 32 and the overlying upper cleat support base 34a.

Three separate kinds of shims can be used, and multiple numbers of each that can be used at a time. One kind of shim (depicted in FIG. 10A) has a wedge configuration, with greater thickness on its inward side. Using two such shims will provide a valgus tilt of 2°, as shown in FIG. 10B. A second kind of shim (not depicted in the drawings) has an oppositely directed wedge configuration, with greater thickness on its outward side. Again, using two such shims will provide a varus tilt of 2°, as shown in FIG. 10C. Finally, a third kind of shims (not depicted in the drawings) has a uniform thickness. Each of these shims will raise the level of the pedal assembly's upper cleat support base 34a by 1 mm. Of course, because the pedal assembly is double-sided, if any shims are used on the assembly's upper side, the same shims should be used on its lower side.

One important advantage of the pedal assembly's shim configuration is that any number of shims can be used without affecting the engagement between the pedal assembly 10 and the cleat assembly 12. This is because the engagement is provided entirely by the upper cleat support base 34a and the forward and rearward cleat retainers 36a, 38a that are mounted to it or a part of it. All of the shims are located beneath the upper cleat support base and thus function merely alter its height or angle. This greatly simplifies the adjustment process.

Those skilled in the art will appreciate that various other devices alternatively could be used for adjusting the height and/or varus/valgus tilt of the upper cleat support base 34a relative to the underlying main pedal body 32. For example, selected numbers of simple washers could be positioned beneath the upper cleat support base, in alignment with the screws 50. Alternatively, adjustment screws could be used to adjust the spacing of the upper cleat support base relative to the underlying main pedal body.

It should be appreciated from the foregoing description that the present invention provides an improved pedal/cleat assembly in which only the forward cleat retainer of the pedal assembly is spring-biased, with the rearward cleat retainer being fixed. This minimizes the possibility that the rider can unintentionally disengage his cleat assembly from the pedal assembly when vigorously pedaling, and it prevents the waste of energy retracting a cleat retainer during normal use of the pedal assembly. The pedal/cleat assembly also is configured such that a downward force is continuously applied to the cleat assembly, to enhance its engagement with the pedal assembly. Further, special shims can be used to allow for a convenient adjustment of the pedal assembly, to accommodate riders having biomechanical issues such as leg-length discrepancies and varus and valgus tilt, all without affecting in any way the engagement between the cleat and pedal assemblies.

It also should be appreciated that the invention has been described in detail with reference only to the presently preferred embodiment. Various modifications can be made without departing from the invention. Accordingly, the invention is defined only by the following claims.

I claim:

1. A pedal/cleat assembly comprising:
   a cleat configured for attachment to the underside of a rider's shoe, the cleat defining a cleat rotation axis and including:
      a forward cleat projection facing the toe end of the shoe,
      a rearward cleat projection facing the heel end of the shoe,
      an inward foot formed of a hard, non-resilient material and located on a portion of the cleat nearest an inward side of the shoe, and
      an outward foot formed of a hard, non-resilient material and located on a portion of the cleat nearest an outward side of the shoe; and
   a pedal configured to releasably secure the cleat, the pedal including:
      a spindle defining a spindle axis,
      a main pedal body mounted on the spindle for rotation about the spindle axis and having an upper side facing the cleat,
      an upper cleat support base mounted to the upper side of the main pedal body,
      an upper set of cleat retainers, including a forward cleat retainer and a rearward cleat retainer, secured to, and projecting upward from, the upper cleat support base, respectively forward and rearward of the spindle, wherein the forward and rearward cleat retainers are configured to receive and retain the respective forward cleat projection and rearward cleat projection, to secure the cleat to the pedal,
      an upper spring-bias device for yieldably biasing the forward and rearward cleat retainers toward each other, wherein the upper cleat support base includes an inward pad and an outward pad, wherein the pads are formed of a hard, non-resilient material and are configured to support the cleat's respective inward foot and outward foot when the cleat is secured to the pedal, and wherein the upper cleat support base has a nominal valgus or varus tilt, and one or more shims, at least one shim having a wedge configuration, disposed between the main pedal body and the upper cleat support base, for modifying the valgus or varus tilt of the upper cleat support base without affecting the cleat's engagement with the pedal;

wherein rotation of the cleat about the cleat rotation axis, when the cleat is secured to the pedal, forcibly moves the forward and rearward cleat retainers apart from each other, against the yielding bias of the upper spring-bias device, to release the cleat from the pedal.

2. A pedal/cleat assembly as defined in claim 1, wherein the upper cleat support base is a single unitary body.

3. A pedal/cleat assembly as defined in claim 2, wherein:
the rearward cleat retainer is fixed relative to the upper cleat support base;
the forward cleat retainer is mounted to the upper cleat support base for movement toward and away from the rearward cleat retainer; and
the upper spring-bias device yieldably biases the forward cleat retainer toward the rearward cleat retainer.

4. A pedal/cleat assembly as defined in claim 3, wherein:
the forward cleat retainer is mounted for pivoting movement about a pivot axis parallel with the spindle axis; and
the upper spring-bias device comprises a helical coil section having an axis aligned with the pivot axis of the forward cleat retainer and having a first end and a second end, wherein the first end is coupled to the forward cleat retainer and the second end is coupled to the upper cleat support base.

5. A pedal/cleat assembly as defined in claim 4, wherein the pedal further comprises a spring tension adjuster coupling the second end of the upper spring-bias device's helical coil section to the upper cleat support base, wherein the spring tension adjuster is configured to adjust the helical coil section's resistance to pivoting movement of the forward cleat retainer in a direction away from the rearward cleat retainer.

6. A pedal/cleat assembly as defined in claim 1, wherein the pedal further includes:
a lower cleat support base mounted to the underside of the main pedal body;
a lower set of cleat retainers, including a forward cleat retainer and a rearward cleat retainer, secured to, and projecting downward from, the lower cleat support base; and
a lower spring-bias device for yieldably biasing the forward and rearward cleat retainers of the lower set toward each other.

7. A pedal/cleat assembly as defined in claim 6, wherein:
the upper cleat support base and the lower cleat support base each include one or more unthreaded holes and one or more threaded holes; and
the pedal further comprises a plurality of screws for extending through the one or more unthreaded holes of the upper cleat support base and the lower cleat support base to engage the one or more threaded holes of the respective lower and upper cleat support bases, to secure the upper and lower cleat support bases to the main pedal body.

8. A pedal/cleat assembly as defined in claim 1, wherein:
the forward and rearward cleat projections each have an upper engagement surface;
the forward and rearward cleat retainers each have a lower retainer surface configured to engage the upper engagement surface of the respective forward and rearward cleat projections; and
the upper engagement surface of the forward cleat projection, the upper engagement surface of the rearward cleat projection, the lower retainer surface of the forward cleat retainer, and the lower retainer surface of the rearward cleat retainer are configured to cooperate with the yieldable bias provided by the lower spring-bias device to urge the cleat's inward and outward feet into compressive engagement with the upper cleat support base's respective inward and outward pads.

9. A pedal/cleat assembly as defined in claim 8, wherein:
the upper engagement surface of the forward cleat projection slopes downward and forward;
the upper engagement surface of the rearward cleat projection slopes downward and rearward;
the lower retainer surface of the forward cleat retainer slopes downward and forward, to conform with the upper engagement surface of the forward cleat projection; and
the lower retainer surface of the rearward cleat retainer slopes downward and rearward, to conform with the upper engagement surface of the rearward cleat projection.

10. A pedal/cleat assembly as defined in claim 1, wherein the cleat's forward cleat projection, rearward cleat projection, inward foot, and outward foot, together form an integral body.

11. A pedal/cleat assembly comprising:
a cleat configured for attachment to the underside of a rider's shoe, the cleat defining a cleat rotation axis and including:
a forward cleat projection facing the toe end of the shoe,
a rearward cleat projection facing the heel end of the shoe, and
an inward foot and an outward foot, aligned with each other along an axis transverse to an axis between the shoe's toe end and heel end; and
a pedal configured to releasably secure the cleat, the pedal including:
a spindle defining a spindle axis,
a main pedal body mounted on the spindle for rotation about the spindle axis, the main pedal body having an upper side facing the cleat,
an upper cleat support base mounted on the upper side of the main pedal body, the upper cleat support base including an inward pad and an outward pad configured to support the cleat's respective inward foot and outward foot when the cleat is secured to the pedal, wherein the inward pad and the outward pad have a prescribed nominal valgus or varus relative to the main pedal body,
an upper set of cleat retainers, including a forward cleat retainer and a rearward cleat retainer, projecting upward from the upper side of the main pedal body, respectively forward and rearward of the spindle axis, and configured to receive and retain the cleat's respective forward and rearward cleat projections, to secure the cleat to the pedal,
wherein the rearward cleat retainer is fixed relative to the main pedal body and the forward cleat retainer is configured to be movable toward and away from the rearward cleat retainer, an upper spring-bias device that yieldably biases the forward cleat retainer toward the rearward cleat retainer, and one or more shims configured to be secured between the main pedal body and the upper cleat support base, at least one of the one or more shims having a wedge configuration, so as to raise or lower the inward pad relative to the outward pad and thereby alter the cleat support base's valgus or varus tilt, without affecting the engagement of the cleat with the pedal;

wherein rotation of the cleat about the cleat rotation axis, when the cleat is secured to the pedal, forcibly moves the forward cleat retainer forward, against the yielding bias of the upper spring-bias device, to release the cleat from the pedal.

12. A pedal/cleat assembly as defined in claim 11, wherein:
the rearward cleat retainer is fixed relative to the upper cleat support base; and
the forward cleat retainer and the upper spring-bias device are mounted to the upper cleat support base, such that the forward cleat retainer is movable toward the rearward cleat retainer axis, against the yielding bias of the upper spring-bias device.

13. A pedal/cleat assembly as defined in claim 12, wherein the pedal further includes:
a lower cleat support base mounted to the underside of the main pedal body;
a lower set of cleat retainers, including a forward cleat retainer and a rearward cleat retainer, secured to, and projecting downward from, the lower cleat support base, wherein the rearward cleat retainer of the lower set is fixed relative to the lower cleat support base and the forward cleat retainer of the lower set is movable toward and away from the rearward cleat retainer of the lower set; and
a lower spring-bias device that yieldably biases the forward cleat retainer of the lower set toward the rearward cleat retainer of the lower set.

14. A pedal/cleat assembly as defined in claim 11, wherein:
the forward cleat projection and the rearward cleat projection each have an upper engagement surface;
the forward cleat retainer and the rearward cleat retainer each have a lower retainer surface configured to engage the upper engagement surface of the respective forward and rearward cleat projections; and
the upper engagement surface of the forward cleat projection, the upper engagement surface of the rearward cleat projection, the lower retainer surface of the forward cleat retainer, and the lower retainer surface of the rearward cleat retainer are configured to cooperate with the yieldable bias provided by the spring-bias device to urge the cleat downward toward the main pedal body.

15. A pedal/cleat assembly as defined in claim 14, wherein:
the forward cleat projection includes an upper engagement surface that slopes downward and forward;
the rearward cleat projection includes an upper engagement surface that slopes downward and rearward;
the pedal's forward cleat retainer includes a lower retainer surface that slopes downward and forward, to conform with the upper engagement surface of the forward cleat projection; and
the pedal's rearward cleat retainer includes a lower retainer surface that slopes downward and rearward, to conform with the upper engagement surface of the rearward cleat projection.

16. A pedal/cleat assembly comprising:
a cleat configured for attachment to the underside of a rider's shoe, the cleat defining a cleat rotation axis and including a forward cleat projection facing the toe end of the shoe and a rearward cleat projection facing the heel end of the shoe, wherein each of the forward and rearward cleat projections has an upper engagement surface; and
a pedal configured to releasably secure the cleat, the pedal including:
a spindle defining a spindle axis,
a main pedal body mounted on the spindle for rotation about the spindle axis and having an upper side facing the cleat, and
an upper set of cleat retainers, including a forward cleat retainer and a rearward cleat retainer projecting upward from the upper side of the main pedal body, respectively forward and rearward of the spindle axis, and having lower retainer surfaces configured to engage the upper engagement surfaces of the respective forward and rearward cleat projections, to receive and retain the projections and thereby secure the cleat to the pedal, and
a spring-bias device for yieldably biasing the forward and rearward cleat retainers toward each other;
wherein the upper engagement surface of the forward cleat projection, the upper engagement surface of the rearward cleat projection, the lower retainer surface of the forward cleat retainer, and the lower retainer surface of the rearward cleat retainer are configured such that the yielding bias provided by the spring-bias device continuously biases the cleat downward toward the main pedal body, including when the cleat is secured to the pedal; and
wherein rotation of the cleat about the cleat rotation axis, when the cleat is secured to the pedal, forcibly moves the forward and rearward cleat retainers apart from each other, against the yielding bias of the spring-bias device, to release the cleat from the pedal.

17. The pedal/cleat assembly as defined in claim 16, wherein:
the upper engagement surface of the forward cleat projection slopes downward and forward; and
the upper engagement surface of the rearward cleat projection slopes downward and rearward.

18. The pedal/cleat assembly as defined in claim 17, wherein:
the lower retainer surface of the forward cleat retainer slopes downward and forward, to conform with the upper engagement surface of the forward cleat projection, and
the lower retainer surface of the rearward cleat retainer slopes downward and rearward, to conform with the upper engagement surface of the rearward cleat projection.

19. The pedal/cleat assembly as defined in claim 16, wherein:
the forward cleat retainer is mounted for pivoting movement about a pivot axis that is parallel with the spindle axis and forward of the forward cleat projection when the cleat is secured to the pedal; and
the spring-bias device comprises a helical coil section having an axis aligned with the pivot axis of the forward cleat retainer and having a first end coupled to the forward cleat retainer and a second end coupled to the upper cleat support base.

* * * * *